J. A. GRANT & T. M. McCLELLAND.
Ditching-Machine.
No. 213,897. Patented April 1, 1879.
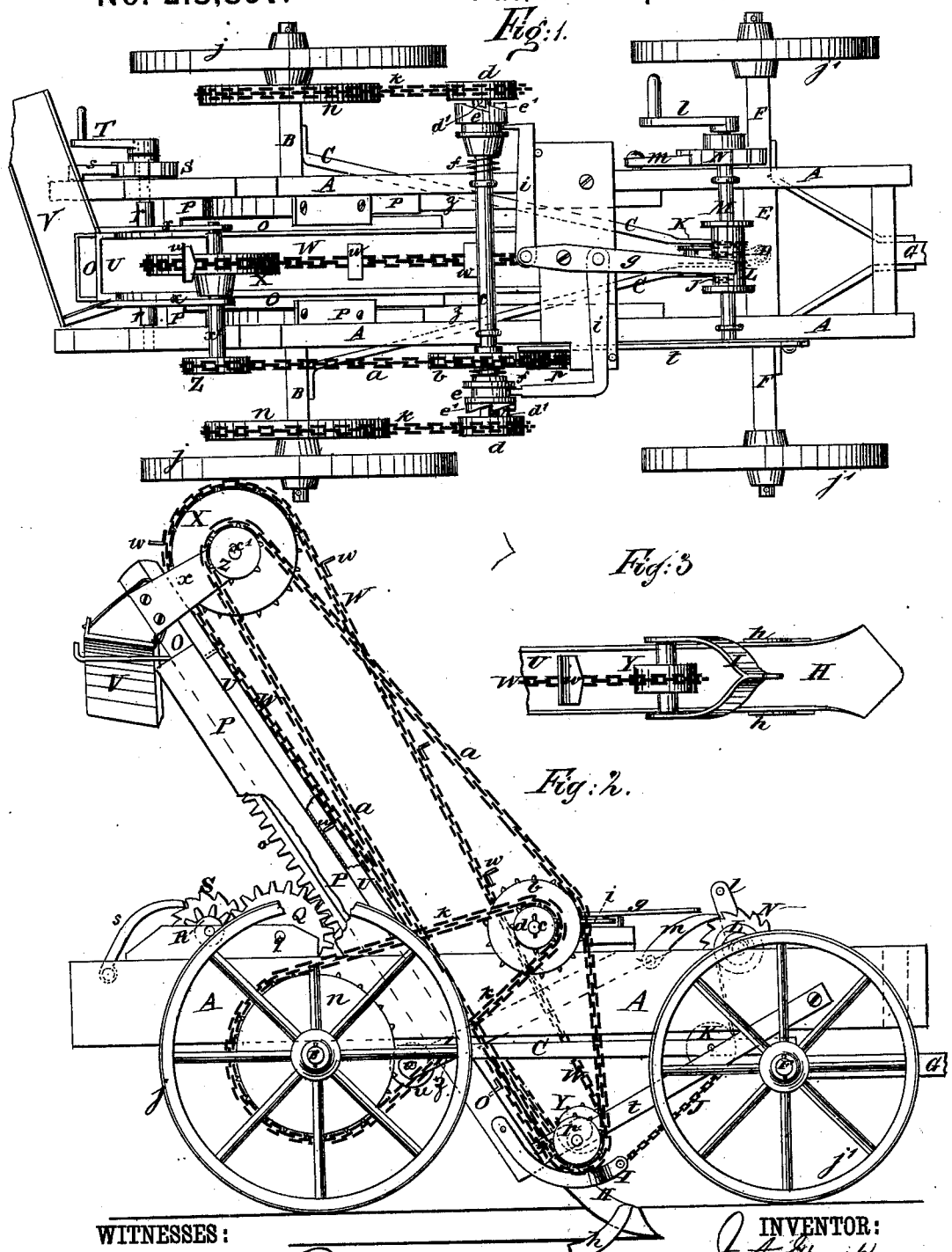

UNITED STATES PATENT OFFICE.

JAMES A. GRANT AND THOMAS M. McCLELLAND, OF MOUNT PLEASANT, IOWA.

IMPROVEMENT IN DITCHING-MACHINES.

Specification forming part of Letters Patent No. 213,897, dated April 1, 1879; application filed May 21, 1878.

*To all whom it may concern:*

Be it known that we, JAMES A. GRANT and THOMAS M. McCLELLAND, of Mount Pleasant, in the county of Henry and State of Iowa, have invented a new and Improved Ditching-Machine, of which the following is a specification:

The object of our invention is to furnish an effective and convenient machine for making open ditches for tile drains and other purposes, and which may be mounted on wheels, and made to operate by simply drawing it along the field like an ordinary wagon.

The invention consists in the construction and combination of the various parts, as will be hereinafter described and claimed.

In the accompanying drawings, Figure 1 represents a top view of our improved ditching-machine. Fig. 2 is a side elevation of the same, partly broken out. Fig. 3 is a detail plan view of a portion of the ditching-plow.

Similar letters of reference indicate corresponding parts.

A is the frame of the machine, which may be placed and operated upon the running-gears of an ordinary road-wagon, or on a wagon specially constructed for the ditching-machine. B is the rear axle, which is secured by the reach C to the king-bolt D, the latter being fastened to the center of a cross-bar, E, (secured to the under side of the frame A,) and serving as pivot for the front axle, F, as usual in wagons. G is the tongue. H is the ditching-plow, which, in being drawn along the ground, causes an excavation of the same depth as that to which the plow has been adjusted. The plow H is U-shaped in cross-section and ending with a V-shaped point, so as to make the cross-section most suitable for placing the tile in the center of the trench, and its cutting-edges are flaring sufficiently to give clearance for its sides. The plow is provided on either side with a rearward and downward projecting cutter, $h$, which squares the side of the trench. The plow is provided in front, above the depth of the cut, with a bail or stirrup, I, and is stayed in the line of resistance by the chain J, which is attached with one end to the center of the stirrup I, thence runs under and around the pulley K, pivoted in the reach C, a little behind the king-bolt D, and thence winds on a drum, L, which latter is journaled by the shaft M in bearings upon the frame A, and is operated by a crank, $l$, to slacken or stretch the chain J, and, when stretched, secures it in position by a pawl, $m$, on the frame A, which pawl engages in the teeth of a ratchet-wheel, N, upon the shaft M. The plow H is secured on the lower end of a bar, O, which is arranged to slide between guides P in the frame A at an inclination of about forty-five degrees, more or less, and is provided on its rear side with a toothed rack, $o$, which gears in a cog-wheel, Q, journaled by the shaft $q$ in bearings upon the frame A. The cog-wheel Q meshes with the pinion R upon the shaft $r$, which latter is fitted in bearings upon the frame A, and is provided with a ratchet-wheel, S, held by a pawl, $s$, upon the frame A. The plow-beam O is raised and lowered to adjust the depth of the cut by turning the hand-crank T on the shaft $r$, and is held in position by the pawl $s$. To the forward side of the plow-beam O is attached the elevator-trough U, continuous from the plow to the upper end of the beam O, at which point the soil dug out is dropped into a laterally-inclined chute, V, attached behind the upper end of the plow-beam, and thence falls onto the ground at the side of the trench.

The dirt dug out by the plow is taken hold of and carried up to the chute V by the series of scrapers $w$, fixed upon the elevator-chain W, and arranged to travel in the trough U from the plow H to the chute V. The elevator-chain W is carried by the chain-wheels X Y, which are fixed upon shafts revolving in bearings in the brackets $x$ $y$ at the upper and at the lower end of the plow-beam O, respectively. On the shaft $x'$ of the upper chain-wheel, X, is fixed a chain-pulley, Z, for conveying motion to the elevator-chain W and scrapers $w$, by means of the chain $a$, directly from the chain-wheel $b$, fixed on the shaft $c$, which latter is mounted in bearings on the frame A in front of the elevator. The shaft $c$ is provided at each end with a loose-running chain-pulley, $d$, having teeth $d'$ on the inner side, which engage with the teeth $e'$ of the clutch $e$, to turn the latter when the machine is drawn forward, and to slip off the teeth without turning the clutch $e$ when the machine moves backward. For this purpose the clutch $e$ is fitted to slide upon a square or feather upon the shaft $c$, and is held in gear with the teeth $d'$ by the extension of a spiral spring, $f$, surrounding the shaft $c$. The clutches $e$ are thrown out of gear by the lever $g$, which is fulcrumed upon a cross-bar or platform on the frame A in front of the axle $c$, said lever $g$ having pivoted to it, on opposite sides of its fulcrum, one end of the clutch-bars $i$, the fork on the other end of which is kept in a circular groove in the surface of the clutches $e$. When the clutches $e$ are in gear with the side teeth, $d'$, of the chain-pulley $d$, motion is transmitted to the shaft $c$ from the rear or driving wheels, $j$, by the chains $k$, each of which runs from the pulley $d$ to and around a large or main chain-wheel, $n$, on each side of the machine, which wheel $n$ is secured on the hub of the driving-wheel $j$, and with it runs loose upon the stationary rear axle, B.

The depth of the cut depends upon the distance at which the plow-point is lowered beneath the lowest tangent to the rear wheel, $j$, and the front wheel, $j'$. The slack of the chain $a$, caused by shortening the distance between the chain-wheels Z $b$ by lowering the plow, is taken up by the idling chain-pulley $p$, which is pivoted underneath the chain-wheel $b$ to one end of an arm, $t$, the other end of which is pivoted to the side of the frame A in such a manner that the arm $t$, being free to swing upon its pivot, will allow the pulley $p$ to drop by the force of its own or an added weight, according as the plow is lowered, and thus keep the chain $a$ taut.

The plow-beam is supported in the rear against the resistance of the soil to the plow by one or more friction-rollers, $u$, revolving upon a shaft, $r$, which is secured to the lower ends of oppositely-placed bars $z$, fastened to the inside of the side pieces of the frame A, in the center line of which the plow is adjusted to cut the trench.

It is evident that by several times traversing the field in the same line, and adjusting the depth of the plow for each subsequent cut, a ditch may be dug of any depth required.

Having thus fully described our invention, we claim as new and desire to secure by Letters Patent—

The combination of the shaft $x'$, the elevator chain-wheel X, the chain-wheels Z $b$, chain $a$, shaft $c$, having sliding clutches $e$, loose chain-pulleys $d$, chains $k$, chain-pulleys $n$ upon the hubs of the hind wheels, $j$, and the clutch-shifting levers $g$ $i$ $i$, for the purpose of running, starting, and stopping the elevator, substantially as specified.

JAMES A. GRANT.
   THOMAS M. McCLELLAND.

Witnesses:
 JAMES T. DRUMMOND,
 JAMES BIGELOW.